United States Patent
Tang et al.

(10) Patent No.: US 12,391,398 B1
(45) Date of Patent: Aug. 19, 2025

(54) FUEL JETTISON SYSTEM

(71) Applicant: The Boeing Company, Arlington, VA (US)

(72) Inventors: Patrick Y. Tang, Kirkland, WA (US); Sarah Lucia Barrett, Lynnwood, WA (US); Jonathan M. W. Lipstate, Stanwood, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/432,749

(22) Filed: Feb. 5, 2024

(51) Int. Cl.
    *B64D 37/26*      (2006.01)

(52) U.S. Cl.
    CPC .................................. *B64D 37/26* (2013.01)

(58) Field of Classification Search
    CPC ....... B05B 1/30; B05B 1/3013; B05B 1/3033; B05B 1/304; B05B 1/3006; B64D 1/16; B64D 1/18; B64D 37/32; B64D 37/26
    See application file for complete search history.

(56) References Cited

U.S. PATENT DOCUMENTS

| | | | | |
|---|---|---|---|---|
| 2,123,295 A | * | 7/1938 | Wood | B64D 37/04 244/135 R |
| 2,456,284 A | * | 12/1948 | Jordan | B64D 1/16 244/137.3 |
| 7,111,809 B1 | | 9/2006 | Tai et al. | |
| 9,416,801 B2 | * | 8/2016 | Willie | B64D 37/26 |
| 10,829,194 B2 | * | 11/2020 | Wozniak | B64C 1/1453 |
| 2017/0304847 A1 | * | 10/2017 | Scott | B05B 11/0064 |
| 2024/0359810 A1 | | 10/2024 | Milliere | |

FOREIGN PATENT DOCUMENTS

| | | |
|---|---|---|
| DE | 438710 C | 12/1926 |
| FR | 531351 | 1/1922 |
| GB | 433795 A | 8/1935 |
| GB | 2545688 A | 6/2017 |
| GB | 2606645 A | 11/2022 |

OTHER PUBLICATIONS

Extended European Search Report for application No. 25153638.9 dated Jul. 7, 2025, pp. 1-4.

* cited by examiner

*Primary Examiner* — Joshua J Michener
*Assistant Examiner* — Cindi M Curry
(74) *Attorney, Agent, or Firm* — Moore IP Law

(57) ABSTRACT

A fuel jettison system for the inflight discharge of fuel from an aircraft, and an aircraft having such a fuel jettison system. Using a venturi effect, the fuel jettison system facilitates the inflight discharge of fuel from the aircraft during an inflight fuel jettison operation at a higher velocity that mitigates the effects of turbulence to thereby mitigate an occurrence of fuel jettison impingement on aerodynamic surfaces of the aircraft.

20 Claims, 8 Drawing Sheets

500

Cause transfer of pressurized fuel to fuel jettison system
502

Facilitate discharge of fuel from the aircraft via venturi effect
602

Cause venturi pump housing to advance aft into airstream environment to deployed position
702

FIG. 7

FUEL JETTISON SYSTEM

TECHNICAL FIELD

Examples generally relate to a fuel jettison system for the inflight discharge of fuel from an aircraft at a velocity that mitigates the effects of turbulence to thereby mitigate an occurrence of fuel jettison impingement on aerodynamic surfaces of the aircraft, and an aircraft having such a fuel jettison system.

BACKGROUND

In certain instances, particularly during in flight emergencies, fuel must be discharged, jettisoned, or expelled from the aircraft. Some aircraft designs incorporate one or more fuel jettison systems to facilitate an inflight fuel jettison operation in which fuel is discharged from the aircraft. Such fuel jettison systems generally have a configuration that utilizes a generally cylindrical jettison tube mounted at a trailing edge of a wing of the aircraft.

Certain aircraft designs have wing configurations with narrow spacing between control surfaces at the trailing edge of the wing, thereby influencing jettisoned fuel to adhere to or otherwise impinge on aerodynamic surfaces of the aircraft due to the formation of turbulent airflow at the control surfaces. During specific flight configurations, such turbulent airflow influences the jettisoned fuel to adhere to aerodynamic surfaces of the aircraft. Having fuel adhere to aerodynamic surfaces of the aircraft creates undesirable risks. Thus, during an inflight fuel jettison operation, it is important that the fuel is discharged at a velocity that overcomes the effects of turbulent airflow.

BRIEF SUMMARY

One or more exemplary embodiments provide a fuel jettison system to cause an inflight discharge of fuel from an aircraft at a higher velocity that mitigates the effects of turbulence to thereby mitigate an occurrence of fuel jettison impingement on aerodynamic surfaces of the aircraft, and an aircraft having such a fuel jettison system. Using a venturi effect, the fuel jettison system facilitates the inflight discharge of fuel from the aircraft during an inflight fuel jettison operation at a higher velocity that mitigates the effects of turbulence to thereby mitigate an occurrence of fuel jettison impingement on aerodynamic surfaces of the aircraft.

In accordance with one or more exemplary embodiments, a fuel jettison system to cause an inflight discharge of fuel from one or more fuel storage tanks of an aircraft is provided. The fuel jettison system includes one or more of the following: a venturi pump assembly fluidically coupled to the fuel system, the venturi pump assembly having a venturi pump housing operable for movement (along a longitudinal axis) from a stowed position to a deployed position to at least partially project into an airstream environment of the aircraft to facilitate, via a venturi effect, discharge of entrained fuel from the aircraft at a higher velocity.

In accordance with one or more exemplary embodiments, a fuel jettison system to cause an inflight discharge of fuel from one or more fuel storage tanks of an aircraft is provided. The fuel jettison system includes one or more of the following: a venturi pump assembly fluidically coupled to the fuel system, the venturi pump assembly having a venturi pump housing that facilitates discharge of entrained fuel from the aircraft at a higher velocity via a venturi effect.

In accordance with one or more exemplary embodiments, a fuel jettison system to cause an inflight discharge of fuel from an aircraft is provided. The fuel jettison system includes one or more of the following: a shroud member; and a venturi pump assembly having a venturi pump housing concentrically received in the shroud member for movement from a stowed position in the shroud member to a deployed position to at least partially project from the shroud member to facilitate, via a venturi effect, discharge of entrained fuel from the aircraft at a higher velocity that mitigates the effects of turbulence to thereby mitigate an occurrence of fuel jettison impingement on aerodynamic surfaces of the aircraft.

In accordance with the fuel jettison system, the venturi pump housing is caused to advance aft relative to the wing and in a longitudinal direction relative to the shroud member to the deployed position through a flow of pressurized fuel from a fuel system into the venturi pump housing.

In accordance with the fuel jettison system, the venturi pump housing comprises a transition zone, that transfers energy from the airstream to the fuel to accelerate the fuel, to receive, from the fuel system, fuel to be discharged from the aircraft.

In accordance with the fuel jettison system, the venturi pump housing comprises one or more air inlets operable to draw, in the deployed position of the venturi pump housing, an airstream (as a motive fluid) flowing over an aerodynamic surface of the aircraft into the transition zone to entrain the fuel.

In accordance with the fuel jettison system, the venturi pump assembly comprises a venturi nozzle (arranged downstream of the transition zone) which causes an increase in flow velocity of the entrained fuel via the venturi effect to facilitate discharge of the entrained fuel from the aircraft at a higher velocity that mitigates the effects of turbulence to thereby mitigate an occurrence of fuel jettison impingement on aerodynamic surfaces of the aircraft.

In accordance with the fuel jettison system, one or more air collector members are rotatably coupled to the venturi pump housing to capture the airstream flowing over the aerodynamic surface of the aircraft.

In accordance with the fuel jettison system, the one or more air collector members are operable for rotation from a stowed air collector position which covers the one or more air inlets to a deployed air collector position which exposes the one or more air inlets to facilitate capture of the airstream to be drawn into the venturi pump housing (e.g., to the transition zone) for entrainment of the fuel.

In accordance with the fuel jettison system, one or more bias members (spring members) operable to apply a spring load to a corresponding one of the one or more air collector members in the stowed air collector position of the one or more air collector members.

In accordance with the fuel jettison system, the movement of the venturi pump housing to the deployed position facilitates rotation of the one or more air collector members to the deployed position by force of the spring load and an aerodynamic load during flight of the aircraft.

In accordance with the fuel jettison system, the spring load and the aerodynamic load facilitates rotation of the one or more air collector members to an orientation relative to the venturi pump housing that facilitates the capture of the airstream.

In accordance with one or more exemplary embodiments, an aircraft is provided, the aircraft including at least one or more of the following: a fuel jettison system including: a shroud member; and a venturi pump assembly having a venturi pump housing concentrically received in the shroud member for movement from a stowed position in the shroud member to a deployed position to at least partially project from the shroud member into an airstream environment of the aircraft to facilitate, via a venturi effect, discharge of entrained fuel from the aircraft at a higher velocity that mitigates the effects of turbulence to thereby mitigate an occurrence of fuel jettison impingement on aerodynamic surfaces of the aircraft.

In accordance with one or more exemplary embodiments, an aircraft is provided, the aircraft including at least one or more of the following: a fuel jettison system to cause an inflight discharge of fuel from a fuel system of the aircraft, the fuel jettison system including: a venturi pump assembly fluidically coupled to the fuel system, the venturi pump assembly having a venturi pump housing operable for movement (along a longitudinal axis) from a stowed position to a deployed position to at least partially project into an airstream environment of the aircraft to facilitate, via a venturi effect, discharge of entrained fuel from the aircraft at a higher velocity that mitigates the effects of turbulence to thereby mitigate an occurrence of fuel jettison impingement on aerodynamic surfaces of the aircraft.

In accordance with one or more exemplary embodiments, an aircraft is provided, the aircraft including at least one or more of the following: a fuel jettison system to cause an inflight discharge of fuel from a fuel system of the aircraft, the fuel jettison system including: a venturi pump assembly fluidically coupled to the fuel system, the venturi pump assembly having a venturi pump housing that facilitates, via a venturi effect, discharge of entrained fuel from the aircraft at a velocity that mitigates the effects of turbulence at aerodynamic surfaces of the aircraft.

In accordance with one or more exemplary embodiments, an aircraft is provided, the aircraft including at least one or more of the following: a fuel system; and a fuel jettison system to cause an inflight discharge of fuel from the fuel system, the fuel jettison system including: a shroud member; and a venturi pump assembly having a venturi pump housing concentrically received in the shroud member for movement from a stowed position in the shroud member to a deployed position to at least partially project from the shroud member to facilitate, via a venturi effect, discharge of entrained fuel from the aircraft at a velocity that mitigates the effects of turbulence to thereby mitigate an occurrence of fuel jettison impingement on aerodynamic surfaces of the aircraft.

In accordance with the aircraft, the venturi pump housing is caused to advance aft relative to the wing and in a longitudinal direction relative to the shroud member to the deployed position through a flow of pressurized fuel from the fuel system into the venturi pump housing.

In accordance with the aircraft, the venturi pump housing comprises a transition zone to receive, from the fuel system, fuel to be discharged from the aircraft.

In accordance with the aircraft, the venturi pump housing comprises one or more air inlets operable to draw, in the deployed position of the venturi pump housing, an airstream (as a motive fluid) flowing over an aerodynamic surface of the aircraft into the transition zone to entrain the fuel.

In accordance with the aircraft, the venturi pump assembly comprises a venturi nozzle (arranged downstream of the transition zone) which causes an increase in flow velocity of the entrained fuel via the venturi effect to facilitate discharge of the entrained fuel from the aircraft.

In accordance with the aircraft, one or more air collector members are rotatably coupled to the venturi pump housing to capture the airstream flowing over the aerodynamic surface of the aircraft.

In accordance with the aircraft, the one or more air collector members are operable for rotation from a stowed air collector position which covers the one or more air inlets to a deployed air collector position which exposes the one or more air inlets to facilitate capture of the airstream to be drawn into the venturi pump housing (e.g., to the transition zone) for entrainment of the fuel.

In accordance with the aircraft, one or more bias members (spring members) operable to apply a spring load to a corresponding one of the one or more air collector members in the stowed air collector position of the one or more air collector members.

In accordance with the aircraft, movement of the venturi pump housing to the deployed position facilitates rotation of the one or more air collector members to the deployed position by force of the spring load and an aerodynamic load during flight of the aircraft.

In accordance with the aircraft, the spring load and the aerodynamic load facilitates rotation of the one or more air collector members to an orientation relative to the venturi pump housing that facilitates the capture of the airstream.

In accordance with one or more exemplary embodiments, a method of fabricating a fuel jettison system for an aircraft in flight is provided. The method includes one or more of the following: causing a transfer of pressurized fuel from one or more fuel storage tanks of a fuel system to a transition zone of a venturi pump housing. The venturi pump housing forming part of a fuel jettison system.

In accordance with one or more exemplary embodiments, a method of fabricating a fuel jettison system for an aircraft in flight is provided. The method includes one or more of the following: causing, via a venturi effect, discharge of fuel from an inflight aircraft at a higher velocity that mitigates the effects of turbulence to thereby mitigate an occurrence of fuel jettison impingement on aerodynamic surfaces of the aircraft.

In accordance with one or more exemplary embodiments, a method of fabricating a fuel jettison system for an aircraft in flight is provided. The method includes one or more of the following: causing a venturi pump housing of a fuel jettison system to advance aft relative to the wing and into an airstream environment of the aircraft to a deployed position.

In accordance with the method, causing the transfer of fuel to the transition zone comprises causing one or more control valves of the fuel system to move to an open position.

In accordance with the method, entry of the pressurized fuel into the transition zone forces the venturi pump housing to advance aft relative to the wing and into the airstream environment to a deployed position.

In accordance with the method, further including inducing, concurrently with the venturi pump housing advancing in an aft direction (relative to a wing of the aircraft) into the airstream environment to the deployed position, one or more deployable air collector members of the fuel jettison system to a deployed air collector position by spring loading and aerodynamic loading.

In accordance with the method, inducing the one or more deployable air collector members to the deployed air collector position draws an airstream flowing over an aerodynamic surface of the aircraft into the transition zone to entrain the pressurized fuel.

In accordance with the method, drawing the airstream into the venturi pump housing entrains the fuel for acceleration caused by a venturi nozzle of the fuel jettison system.

In accordance with the method, acceleration of the entrained fuel through the venturi nozzle increases the flow velocity of the entrained fuel as it is discharged from the aircraft.

BRIEF DESCRIPTION OF DRAWINGS

The various advantages of the examples of the present disclosure will become apparent to one skilled in the art by reading the following specification and appended claims, and by referencing the following drawings, in which:

FIGS. 5 through 7 respectively illustrate a flow diagram of an advantageous embodiment of a method of conducting an inflight fuel jettison operation.

DESCRIPTION

A fuel jettison system for discharging fuel from an aircraft, and an aircraft having such a fuel jettison system. The fuel jettison system includes components, assemblies, and sub-assemblies that facilitate, via a venturi effect, discharge of entrained fuel from an inflight aircraft at a higher velocity that mitigates the effects of turbulence to thereby mitigate an occurrence of fuel jettison impingement on aerodynamic surfaces of the aircraft. Meaning, the fuel jettison system passively causes acceleration of the fuel (e.g., an increase in flow velocity of the fuel) via the venturi effect. As a result, the fuel is jettisoned from the inflight aircraft in a manner that mitigate an occurrence of discharged fuel adhering to aerodynamic surfaces of the aircraft.

The fuel jettison system may be mounted at an aerodynamic surface of the aircraft, and includes a venturi pump assembly having a venturi pump housing that is fluidically coupled to a fuel system to execute an inflight fuel jettison operation (i.e., after takeoff and before landing) of the aircraft. Entry of the pressurized fuel into the fuel jettison system forces the venturi pump housing to advance aft relative to the wing and in a longitudinal direction from a stowed position to a deployed position. Deployment of the venturi pump housing thereby causes a capture of an airstream flowing over an aerodynamic surface of the aircraft. The captured airstream is then drawn into the venturi pump housing to cause entrained fuel flow. Meaning, the momentum from the drawn airstream is transferred to the fuel in the venturi pump housing, thereby causing the fuel to be entrained by the drawn airstream. The entrained fuel is accelerated through a venturi nozzle in the venturi pump housing, thereby causing an increase in flow velocity of the entrained fuel as it is discharged from the aircraft. The venturi effect caused by the venturi nozzle passively increases the flow velocity of the entrained fuel in a manner that overcomes the effects of turbulent airflow so as to mitigate an occurrence of discharged fuel adhering to aerodynamic surfaces of the aircraft.

Figure 1A:
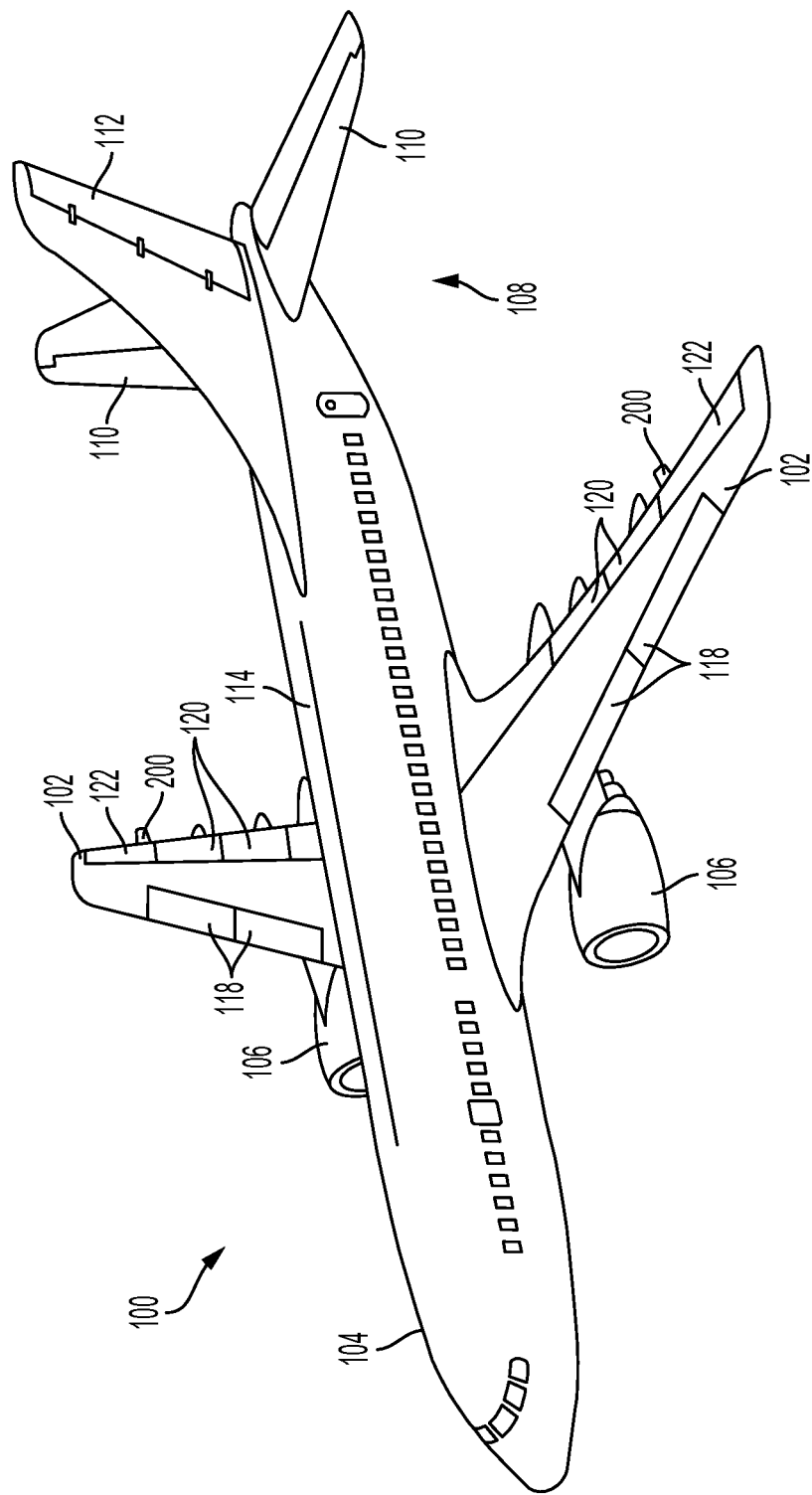
FIG. 1A illustrates a perspective view of an advantageous embodiment of an aircraft having a fuel jettison system.
Figure 1B:
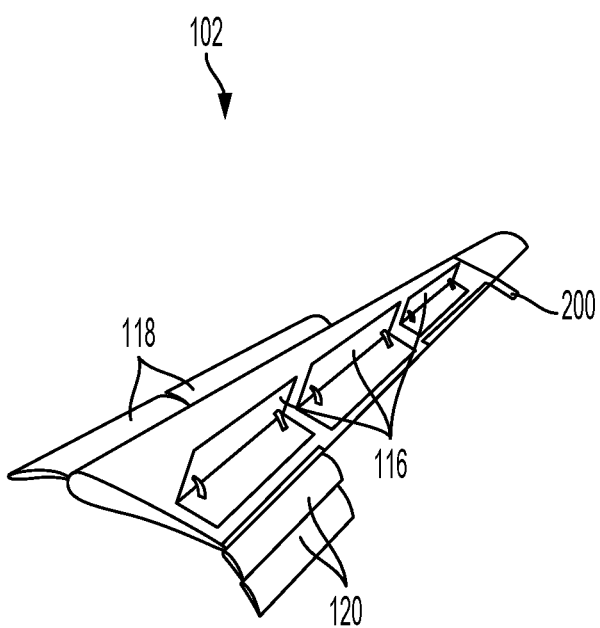
FIG. 1B illustrates a perspective view of a wing of the aircraft of FIG. 1A.

FIGS. 1A and 1B illustrates a perspective view of an aircraft 100, in accordance with one or more exemplary embodiments. The illustrated aircraft 100 is not meant to imply physical or architectural limitations to the manner in which an illustrative configuration may be implemented. For example, although the illustrated aircraft 100 is a commercial aircraft, the one or more exemplary embodiments are not limited thereto. This disclosure contemplates the aircraft 100 comprising other aircraft that fall within the spirit and scope of the principles of this disclosure set forth herein. Such vehicle may include, but are not limited to, military aircraft, a rotorcraft, a helicopter, an unmanned aerial vehicle, and the like.

The aircraft 100 includes wings 102 attached to a fuselage 104, and one or more engines 106 attached to a corresponding one of the wings 102. The fuselage 104 has a tail section 108 with horizontal stabilizers 110 and a rudder 112 (which forms part of a vertical stabilizer that is attached to the tail section 108). The fuselage 104 in some examples has a composite skin 114. Each one of the wings 102 includes various aerodynamic controls and wing mechanization devices mounted on the wings 102 that serve to control the lift, drag, and speed of the aircraft 100. One or more control surfaces such as ailerons 122 are mounted at a trailing edge of the wings 102. One or more spoilers 116 may be selectively deployed to a desired orientation relative to the corresponding one of the wings 102 to create an appropriate amount of drag that at least reduces the speed of the aircraft 100.

One or more slats 118 are mounted on the leading edge of the wings 102, and serve to create lift. The one or more slats 118 are selectively extendable to increase lift during low-speed operations including, for example, takeoff, initial climb, approach, and landing of the aircraft 100. One or more flaps 120 are mounted to the trailing edge of corresponding one of the wings 102 and, when selectively advanced in a generally aft direction, serve to increase both lift and drag, and reduce the stall speed resulting in an enhancement in takeoff and landing performance of the aircraft 100. One or more fuel jettison systems 200 are mounted on a corresponding one of the wings 102 to selectively discharge fuel at a flow velocity that overcomes the effects of turbulent airflow.

Figure 2A:
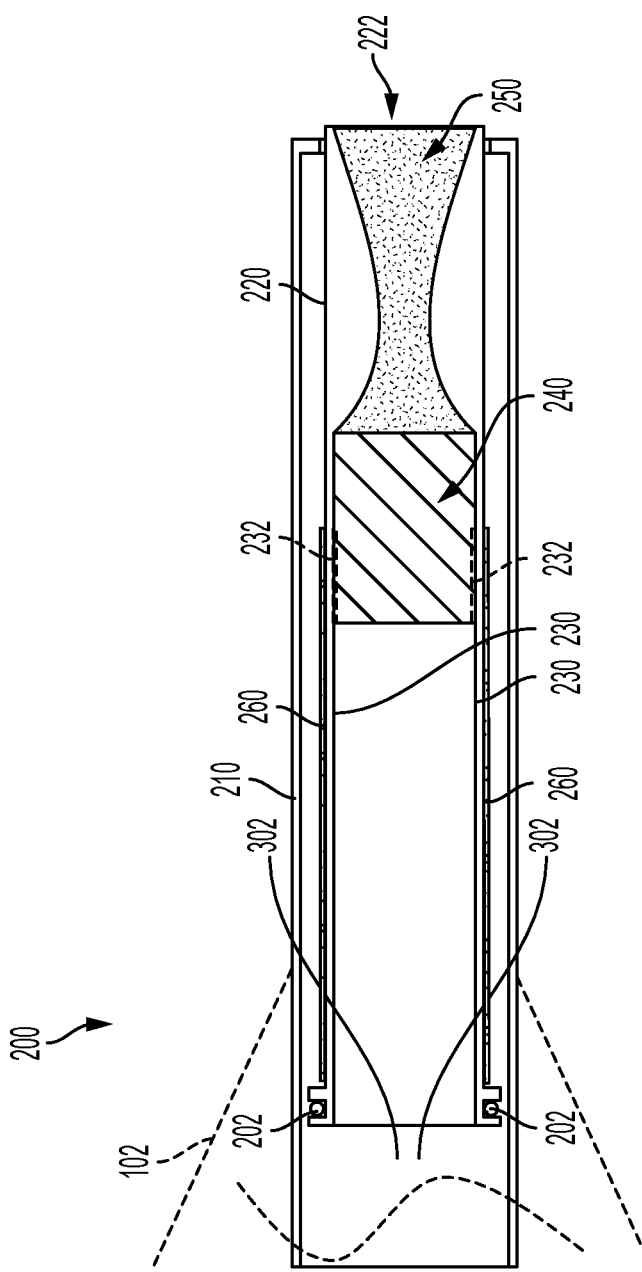
FIG. 2A illustrates a side cross-sectional view of an advantageous embodiment of the fuel jettison system of FIG. 1B in a stowed position.
Figure 2B:
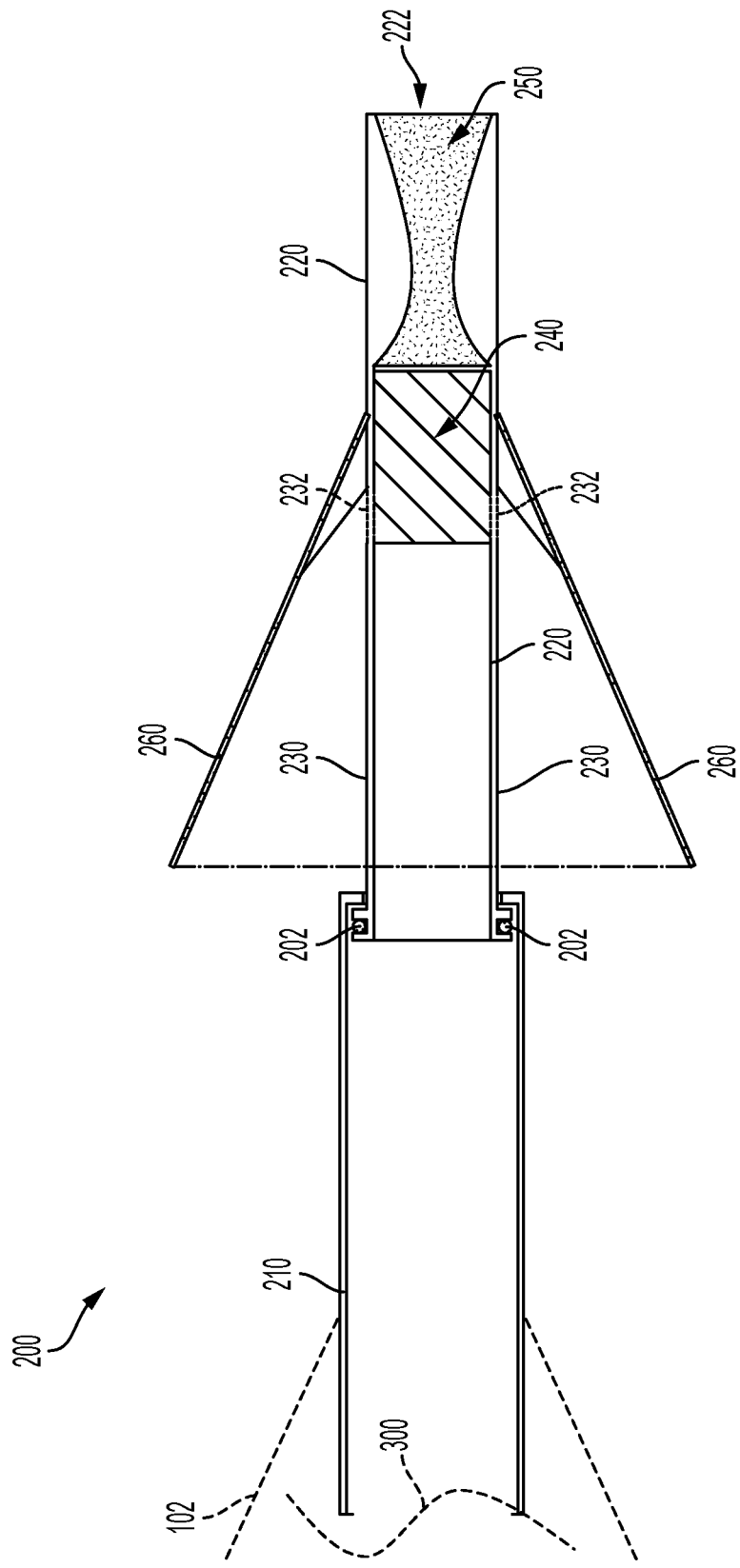
FIG. 2B illustrates a side cross-sectional view of the fuel jettison system of FIG. 1B in a deployed position.
Figure 4:
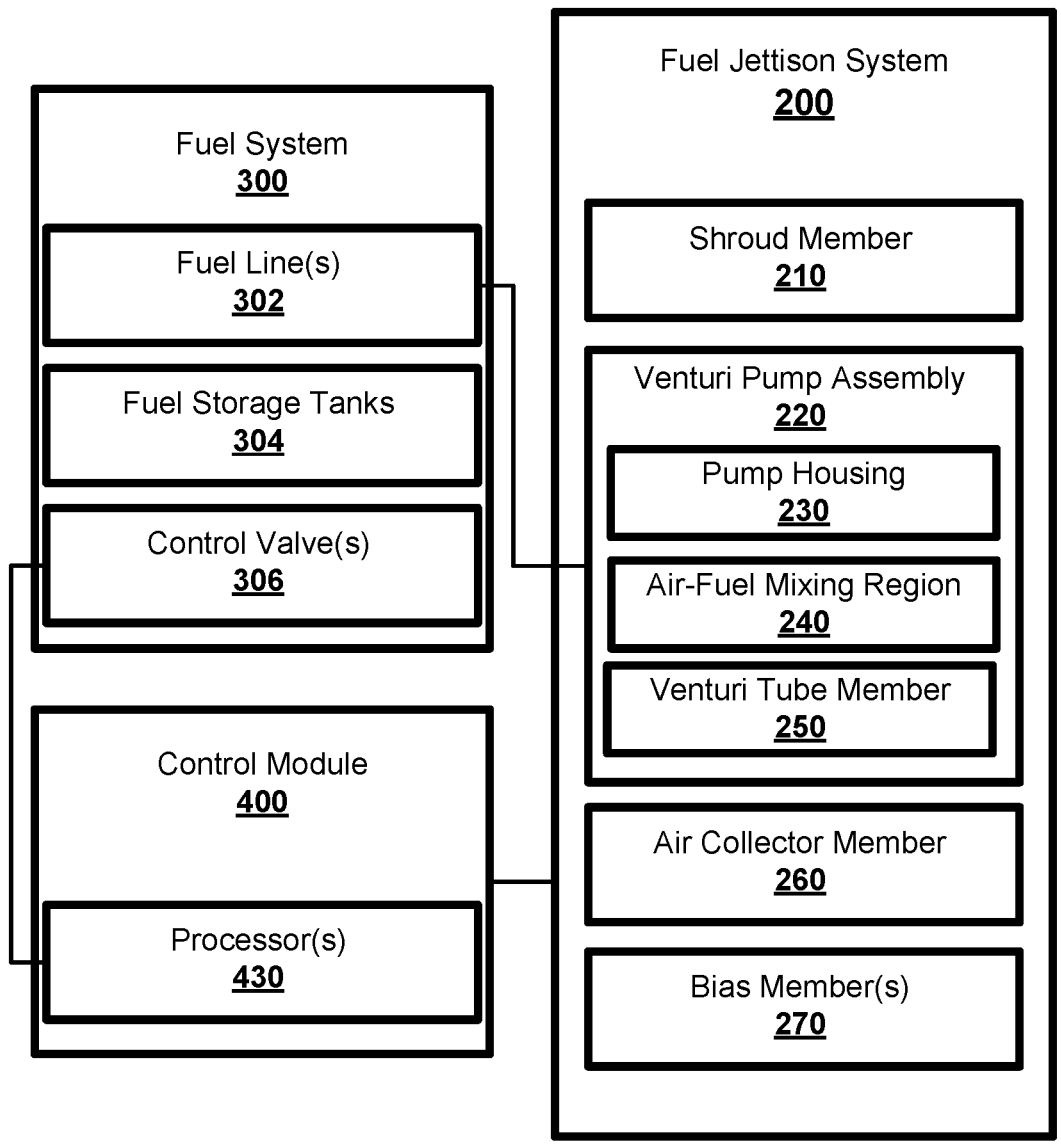
FIG. 4 illustrates a block diagram of the fuel jettison system of FIG. 1B.

FIGS. 2A, 2B, and 4 respectively illustrate an advantageous embodiment of the fuel jettison system 200. The fuel jettison system 200 includes a shroud member 210 to be arranged, positioned, or otherwise mounted at an aerodynamic surface (e.g., a trailing edge of the wing 102) of the aircraft. The shroud member 210 has a generally cylindrical configuration that defines an internal bore. An aft end of the shroud member 210 may include one or more projection members or pistons that project from an interior wall into the bore.

A venturi pump assembly 220 is fluidically coupled to a fuel system 300 that includes a fluid circuit that facilitates fuel flow through the aircraft 100. The fluid circuit fluidically connects, via one or more fuel lines 302, one or more fuel storage tanks 304 to the venturi pump assembly 220. The fluid circuit also includes one or more control valves 306 that are operable to control the flow of pressurized fuel.

The venturi pump assembly 220 includes a venturi pump housing 230 that is concentrically received in the bore of the shroud member 210 for selective movement (along a longitudinal axis) from a stowed position to a deployed position. The venturi pump housing 230 has a generally cylindrical configuration that defines an internal bore. In the stowed position, the venturi pump housing 230 is arranged at least in part inside to be covered by the shroud member 210. Entry of the pressurized fuel into the bore of the venturi pump housing 230 forces the venturi pump housing 230 to advance aft relative to the wing and (in a longitudinal direction) in the bore of the shroud member 210 from a stowed position to a deployed position. The venturi pump housing 230 advances in an aft direction in the bore relative to the wings 102 to at least partially project from the shroud member 210 into an airstream environment of the aircraft 100. The one or more pistons of the shroud member 210 are operable to restrict further movement of the venturi pump housing 230 as it advances to a fully deployed position. In essence, one or more pistons serve to prevent the venturi pump housing 230 from advancing too far outwardly relative to the shroud member 210.

Although the illustrated exemplary embodiment of FIGS. 2A and 2B show an arrangement in which the venturi pump housing 230 is selectively moveable to a deployed position, embodiments are not limited thereto. This disclosure contemplates any arrangement of the venturi pump housing 230 that optimizes or otherwise transforms the performance and functionality of the one or more exemplary embodiments in a manner that falls within the spirit and scope of the principles of this disclosure. For example, the venturi pump housing 230 can, depending on performance requirements, be fixedly connected at a deployed position.

The fuel jettison system 200, in the deployed position of the venturi pump housing 230, is to execute the inflight fuel jettison operation by discharging fuel from the aircraft 100 facilitated by a venturi effect. One or more mechanical seals 202 (e.g., O-rings) may be provided at a junction or interface between the shroud member 210, the venturi pump housing 230, and the fuel feed 204 to prevent fuel leakage during a transfer of fuel to the venturi pump assembly 220. The venturi pump housing 230 has a transition zone 240 where fuel is entrained by an airstream (as a motive fluid) flowing over an aerodynamic surface of the aircraft 100.

A peripheral wall of the venturi pump housing 230 has one or more air inlets 232 spaced apart in a longitudinal direction of the venturi pump housing 230. The one or more air inlets 232 are located proximate the transition zone 240 to facilitate, in the deployed position of the venturi pump housing 230, the selective entry of an airstream into the bore of the venturi pump housing 230, and particularly, the transition zone 240. In at least some exemplary embodiments, the one or more air inlets 232 may have a structural configuration (e.g., size, shape, and orientation) to enhance the selective entry of an airstream (from the airstream environment) at an appropriate volume and flow velocity. The volume and flow velocity of airstream air may be selectively adjusted, calibrated, or otherwise configured to appropriately accelerate the entrained fuel including, for example, based on the aircraft size and type, aircraft use or application, fuel jettison requirements, and other similar requirements and specifications.

The venturi pump assembly 220 also includes a venturi nozzle 250 (e.g., a bell nozzle) arranged at an exit 222 of the venturi pump housing 230 downstream of the transition zone 240. Thus, the venturi nozzle 250 has an enhanced structural configuration along its length (i.e., in a longitudinal direction) that creates a pressure differential which passively causes an increase in acceleration of the entrained fuel via the venturi effect. Such an increase in acceleration, in turn, facilitates discharge of the entrained fuel from the aircraft 100 in a manner that mitigate an occurrence of jettisoned fuel adhering to aerodynamic surfaces of the aircraft 100.

One or more deployable air collector members 260 are rotatably coupled at a rotational axis to an exterior surface of the venturi pump housing 230 to capture an airstream (from the airstream environment) flowing over the aerodynamic surface of the aircraft 100. In at least one exemplary embodiment, the rotational axis is located downstream of the one or more air inlets 232. The one or more air collector members 260 are operable for rotation about the rotational axis from a stowed air collector position (FIG. 2A) to a deployed air collector position (FIG. 2B). While in the stowed air collector position, the one or more air collector members 260 advantageously do not impact the inflight performance of the aircraft 100 by creating drag.

In the stowed air collector position, the one or more air collector members 260 are arranged adjacent to and in substantial contact with the peripheral surface of the venturi pump housing 230 to cover the one or more air inlets 232. By virtue of the stowed position of the venturi pump housing 230, premature entry of an airstream into the transition zone 240 is prevented. Moreover, in the stowed position of the venturi pump housing 230, the one or more air inlets 232 are covered until the venturi pump housing 230 advanced to the deployed position and the one or more air collector members 260 rotate to the deployed air collector position. Meaning, during an inflight fuel jettison operation, the one or more air collector members 260 are caused to rotate in an outwardly direction relative to the venturi pump housing 230 from the stowed air collector position to the deployed air collector position. In the deployed air collector position, the one or more air collector members 260 expose the one or more air inlets 232 to the airstream environment to facilitate capture of the airstream. The captured airstream is then drawn into the transition zone 240 of the venturi pump housing 230 to entrain the fuel to be jettisoned from the aircraft 100. The one or more deployable air collector members 260 are caused to rotate to the deployed air collector position in response to or concurrently with movement of the venturi pump housing 230 to the deployed position.

Although the illustrated exemplary embodiment of FIGS. 2A and 2B show an arrangement in which the one or more air inlets 232, the transition zone 240, and the one or more deployable air collector members 260 are located upstream of the venturi nozzle 250, embodiments are not limited thereto. This disclosure contemplates an arrangement of the one or more air inlets 232, the transition zone 240, and the one or more deployable air collector members 260 at any region of the venturi pump assembly 220 that optimizes or otherwise transforms the performance and functionality of the one or more exemplary embodiments in a manner that falls within the spirit and scope of the principles of this disclosure. For example, the transition zone 240 can be separate from the venturi nozzle 250, or co-located with the venturi nozzle 250 depending on performance requirements.

In another exemplary embodiment, the transition zone 240 is not located upstream of the venturi nozzle 250, but rather at a constricted flow region of the venturi nozzle 250. The peripheral surface of the venturi nozzle 250 at the constricted flow region includes one or more venturi nozzle air inlets that facilitate entry of an airstream into the transition zone 240. To facilitate flow of an airstream into the one or more venturi nozzle air inlets, one or more air inlets 232 are spaced apart at a region of the peripheral wall of the venturi pump housing 230 that partially or fully overlaps the one or more venturi nozzle air inlets. The one or more deployable air collector members 260 are rotatably coupled to the venturi pump housing 230 at a region overlapping the transition zone 240, and thus, the constricted flow region of the venturi nozzle 250. Due to the arrangement of these components, exposure of the one or more air inlets 232 to the airstream environment facilitates capture of the airstream to be drawn into the transition zone 240 at the constricted flow region (via the one or more venturi nozzle air inlets) of the venturi nozzle 250 to thereby entrain the fuel in the venturi nozzle 250. The entrainment of the fuel at the constricted flow region of the venturi nozzle 250 passively causes an even greater rate of acceleration of the entrained fuel through the venturi nozzle 250.

In each exemplary embodiment, one or more bias members 270, such as, for example, spring members, are operable to apply a spring load to the one or more air collector members 260 in the stowed air collector position of the one or more air collector members 260. In response to the movement of the venturi pump housing 230 to the deployed position, the one or more bias members 270 and aerodynamic loading during flight of the aircraft 100 induce rotation of the one or more air collector members 260 to the deployed position under force of the spring load and the aerodynamic load. By virtue of the spring loading and the aerodynamic loading, the one or more air collector members 260 are rotated to an orientation relative to the venturi pump housing 230 that facilitates the capture of an airstream.

Figure 3:
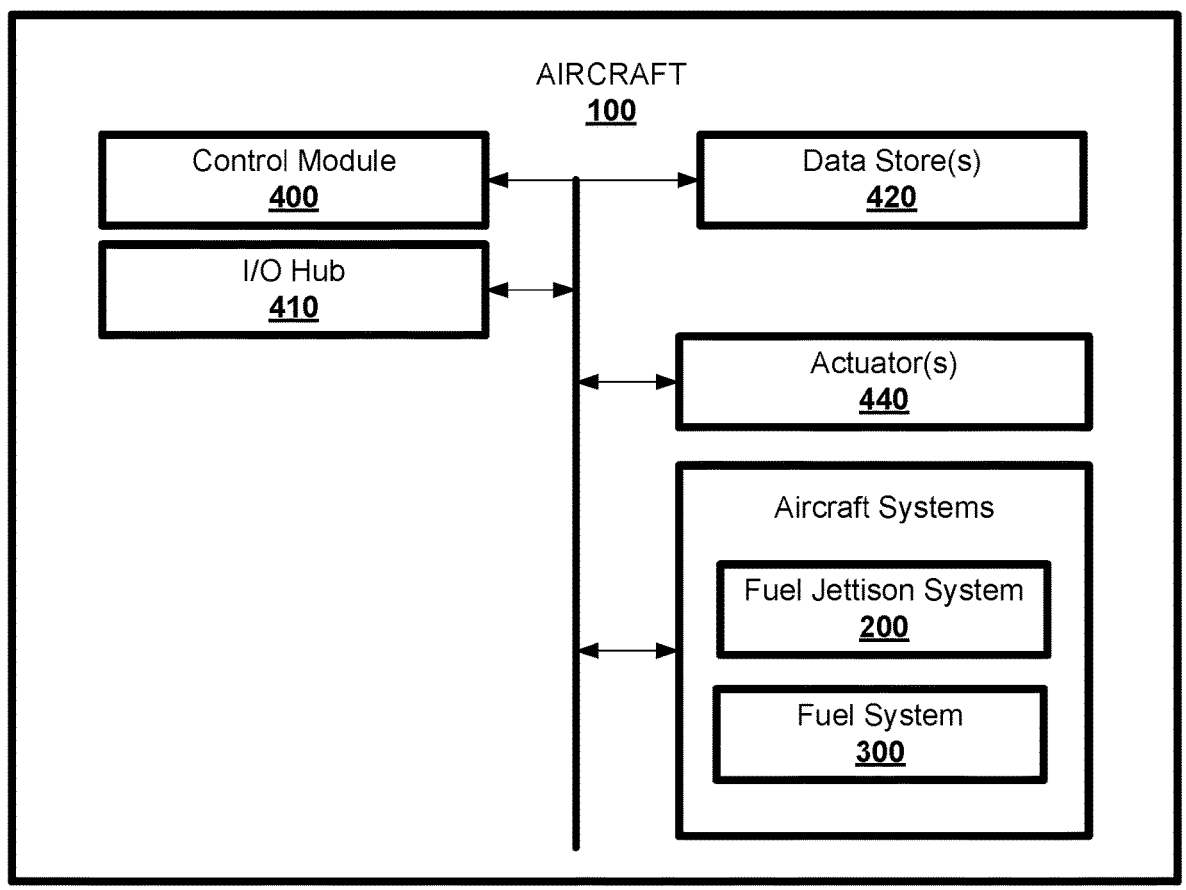
FIG. 3 illustrates a block diagram of the aircraft of FIG. 1A.

As illustrated in FIGS. 3 and 4, the aircraft 100 also includes a control module 400 that serves as a host, main, primary, or secondary control system of the aircraft 100 operable to control components, systems, sub-systems, assemblies, and sub-assemblies of the aircraft 100. The control module 400 may have one or more processors 430. As set forth, described, and/or illustrated herein, "processor" means any component or group of components that are operable to execute any of the processes described herein or any form of instructions to carry out such processes or cause such processes to be performed. The one or more processors 430 may be implemented with one or more general-purpose and/or one or more special-purpose processors. Examples of suitable processors include graphics processors, microprocessors, microcontrollers, DSP processors, and other circuitry that may execute software (e.g., stored on a non-transitory computer-readable medium). Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors 430 may include at least one hardware circuit (e.g., an integrated circuit) operable to carry out instructions contained in program code. The one or more processors 430 may work independently from each other, or may work in combination with each other.

A I/O hub 410 is operatively connected to other systems and subsystems of the aircraft 100. The I/O hub 410 may comprise an input interface and an output interface.

The input interface and the output interface may be integrated as a single, unitary interface, or alternatively, be separate as independent interfaces that are operatively connected. As used herein, the input interface is defined as any device, component, system, subsystem, element, or arrangement or groups thereof that enable information/data to be entered in a machine. The input interface may receive an input from a vehicle operator or a remote operator of the aircraft 100. In one or more example embodiments, the input interface may comprise a user interface (UI), graphical user interface (GUI) such as, for example, a display, human-machine interface (HMI), or the like. Embodiments, however, are not limited thereto, and thus, this disclosure contemplates the input interface comprising any suitable configuration that falls within the spirit and scope of the principles of this disclosure. For example, the input interface may comprise a keypad, toggle switch, touch screen, multi-touch screen, button, joystick, mouse, trackball, microphone and/or combinations thereof.

As used herein, the output interface is defined as any device, component, system, subsystem, element, or arrangement or groups thereof that enable information/data to be presented to the vehicle operator and/or a remote operator of the aircraft 100. The output interface may be operable to present information/data to the vehicle occupant and/or the remote operator. The output interface may comprise one or more of a visual display or an audio display such as a microphone, earphone, and/or speaker. One or more components of the aircraft 100 may serve as both a component of the input interface and a component of the output interface.

One or more data stores 420 are provided for storing one or more types of data. The aircraft 100 may include one or more interfaces that enable one or more systems thereof to manage, retrieve, modify, add, or delete, the data stored in the data stores 420. The data stores 420 may comprise volatile and/or non-volatile memory. Examples of suitable data stores 320 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data stores 420 may be a component of the one or more processors 430, or alternatively, may be operatively connected to the one or more processors 430 for use thereby. As set forth, described, and/or illustrated herein, "operatively connected" may include direct or indirect connections, including connections without direct physical contact.

Operation of the control module 400 may be implemented as computer readable program code that, when executed by a processor, implement one or more of the various processes set forth, described, and/or illustrated herein. The control module 400 may be a component of the one or more processors 430, or alternatively, may be executed on and/or distributed among other processing systems to which the one or more processors 430 are operatively connected. The control module 400 may include a set of logic instructions executable by the one or more processors 430. Alternatively, or additionally, the one or more data stores 420 may contain such logic instructions. The logic instructions may include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

The aircraft 100 may include one or more actuators 440, which may be any element or combination of elements configured to modify, adjust, and/or alter one or more of the vehicle components, systems, sub-systems, assemblies, and sub-assemblies in response to receiving signals or other inputs from one or more of the processors 430. Any suitable actuator may be used. For instance, the one or more actuators 440 may comprise motors, pneumatic actuators, hydraulic pistons, relays, solenoids, and/or piezoelectric actuators, etc.

In at least some exemplary embodiments, the control module 400 is operable to cause execution of an inflight fuel jettison operation. For example, the control module 400 may transmit one or more control signals to the one or more control valves 306 of the fuel system 300 to actuate the one or more control valves 306 to an open position. The opening of the one or more control valves 306 causes pressurized fuel flow from the one or more fuel storage tanks 304 to the fuel jettison system 200. Entry of the pressurized fuel into the fuel jettison system 200 forces the venturi pump housing 230 to advance aft relative to the wing and in a longitudinal direction to the deployed position. The one or more deployable air collector members 260, in response to or concurrently with the venturi pump housing 230 advancing to the deployed position, are induced to the deployed air collector position by the spring load and the aerodynamic load to thereby draw an airstream (as a motive fluid) flowing over an aerodynamic surface of the aircraft 100 into the transition zone 240 to cause entrained fuel flow. The entrained fuel flow causes acceleration of the entrained fuel through the venturi nozzle 250, which causes an increase in flow velocity of the entrained fuel to facilitate discharge of the entrained fuel from the aircraft 100 at a higher velocity. The venturi effect caused by the venturi nozzle 250 passively increases the flow velocity of the entrained fuel in a manner that to facilitates discharge of the entrained fuel at a higher velocity. This serves to mitigate the effects of turbulence in a way that mitigate an occurrence of jettisoned fuel adhering to aerodynamic surfaces of the aircraft 100.

FIGS. 5 to 7 illustrate flowcharts of methods 500 through 700 (such methods 500 through 700 may be computer-implemented) for conducting an inflight fuel jettison operation, in accordance with one or more exemplary embodiments. The respective flowcharts of the methods 500 through 700 may be implemented by the one or more processors 430. For example, the one or more processors 430 are operable to implement the methods 500 through 700 using logic instructions (e.g., software), configurable logic, fixed-functionality hardware logic, etc., or any combination thereof. In one or more examples, software executed by the control module 400 provides functionality described or illustrated herein. In particular, software (e.g., stored on a non-transitory computer-readable medium)) executing by the one or more processors 430 is operable to perform one or more processing blocks of the methods 500 through 700 set forth, described, and/or illustrated herein, or provides functionality set forth, described, and/or illustrated herein.

In the illustrated method 500 of FIG. 5, illustrated process block 502 includes causing a transfer of pressurized fuel from one or more fuel storage tanks (e.g., fuel storage tanks 304) of a fuel system (e.g., fuel system 300) to a transition zone (e.g., transition zone 240) of a venturi pump housing (e.g., venturi pump housing 230). The venturi pump housing forming part of a fuel jettison system (e.g., fuel jettison system 200).

In accordance with illustrated process block 502, causing the transfer of fuel to the transition zone comprises causing one or more control valves (e.g., one or more control valves 306) of the fuel system to move to an open position.

In accordance with illustrated process block 502, entry of the pressurized fuel into the transition zone forces the venturi pump housing to advance aft relative to the wing and into an airstream environment of the aircraft to a deployed position.

In accordance with illustrated process block 502, concurrently with the venturi pump housing advancing in an aft direction (relative to a wing of the aircraft) into an airstream environment of the aircraft to the deployed position, one or more deployable air collector members (e.g., one or more deployable air collector members 260) of the fuel jettison system are induced to a deployed air collector position by spring loading and aerodynamic loading.

In accordance with illustrated process block 502, inducement of the one or more deployable air collector members to the deployed air collector position draws an airstream flowing over an aerodynamic surface of the aircraft into the transition zone to entrain the pressurized fuel.

In accordance with illustrated process block 502, drawing the airstream into the transition zone accelerates the entrained fuel through a venturi nozzle (e.g., venturi nozzle 250) of the fuel jettison system.

In accordance with illustrated process block 502, acceleration of the entrained fuel through the venturi nozzle increases the flow velocity of the entrained fuel to facilitate, via a venturi effect, discharge of the entrained fuel at a higher velocity that mitigates the effects of turbulence to thereby mitigate an occurrence of fuel jettison impingement on aerodynamic surfaces of the aircraft.

In the illustrated method 600 of FIG. 6, illustrated process block 602 includes facilitating, via a venturi effect, discharge of the entrained fuel from an inflight aircraft at a higher velocity that mitigates the effects of turbulence to thereby mitigate an occurrence of fuel jettison impingement on aerodynamic surfaces of the aircraft.

In accordance with illustrated process block 602, causing the discharge of fuel from the inflight aircraft via the venturi effect comprises causing a transfer of pressurized fuel from one or more fuel storage tanks (e.g., fuel storage tanks 304) of a fuel system (e.g., fuel system 300) to a transition zone (e.g., transition zone 240) of a venturi pump housing (e.g., venturi pump housing 230). The venturi pump housing forming part of a fuel jettison system (e.g., fuel jettison system 200).

In accordance with illustrated process block 602, causing the transfer of fuel to the transition zone comprises causing one or more control valves (e.g., one or more control valves 306) of the fuel system to move to an open position.

In accordance with illustrated process block 602, entry of the pressurized fuel into the transition zone forces the venturi pump housing to advance aft relative to the wing and into an airstream environment of the aircraft to a deployed position.

In accordance with illustrated process block 602, concurrently with the venturi pump housing advancing in an aft direction (relative to a wing of the aircraft) into the airstream environment to the deployed position, one or more deployable air collector members (e.g., one or more deployable air collector members 260) of the fuel jettison system are induced to a deployed air collector position by spring loading and aerodynamic loading.

In accordance with illustrated process block 602, inducement of the one or more deployable air collector members to the deployed air collector position draws an airstream flowing over an aerodynamic surface of the aircraft into the transition zone to entrain the pressurized fuel.

In accordance with illustrated process block 602, drawing the airstream into the transition zone accelerates the entrained fuel through a venturi nozzle (e.g., venturi nozzle 250) of the fuel jettison system.

In accordance with illustrated process block 602, acceleration of the entrained fuel through the venturi nozzle increases the flow velocity of the entrained fuel to facilitate, via a venturi effect, discharge of the entrained fuel at a higher velocity that mitigates the effects of turbulence to thereby mitigate an occurrence of fuel jettison impingement on aerodynamic surfaces of the aircraft.

In the illustrated method 700 of FIG. 7, illustrated process block 702 includes causing the venturi pump housing (e.g., venturi pump housing 230) of a fuel jettison system (e.g., fuel jettison system 200) to advance aft relative to the wing and into an airstream environment of the aircraft to a deployed position.

In accordance with illustrated process block 702, causing the venturi pump housing to advance in an aft direction (relative to a wing of the aircraft) into the airstream environment to the deployed position comprises causing a transfer of pressurized fuel from one or more fuel storage tanks (e.g., fuel storage tanks 304) of a fuel system (e.g., fuel system 300) to a transition zone (e.g., transition zone 240) of the venturi pump housing.

In accordance with illustrated process block 702, causing the transfer of fuel to the transition zone comprises causing one or more control valves (e.g., one or more control valves 306) of the fuel system to move to an open position.

In accordance with illustrated process block 702, entry of the pressurized fuel into the transition zone forces the venturi pump housing to advance aft relative to the wing and in a longitudinal direction to a deployed position.

In accordance with illustrated process block 702, concurrently with the venturi pump housing advancing to the deployed position, one or more deployable air collector members (e.g., one or more deployable air collector members 260) of the fuel jettison system are induced to a deployed air collector position by spring loading and aerodynamic loading.

In accordance with illustrated process block 702, inducement of the one or more deployable air collector members to the deployed air collector position draws an airstream flowing over an aerodynamic surface of the aircraft into the transition zone to entrain the pressurized fuel.

In accordance with illustrated process block 702, drawing the airstream into the transition zone accelerates the entrained fuel through a venturi nozzle (e.g., venturi nozzle 250) of the fuel jettison system.

In accordance with illustrated process block 702, acceleration of the entrained fuel through the venturi nozzle increases the flow velocity of the entrained fuel to facilitate, via a venturi effect, discharge of the entrained fuel at a higher velocity that mitigates the effects of turbulence to thereby mitigate an occurrence of fuel jettison impingement on aerodynamic surfaces of the aircraft.

Figure 8:
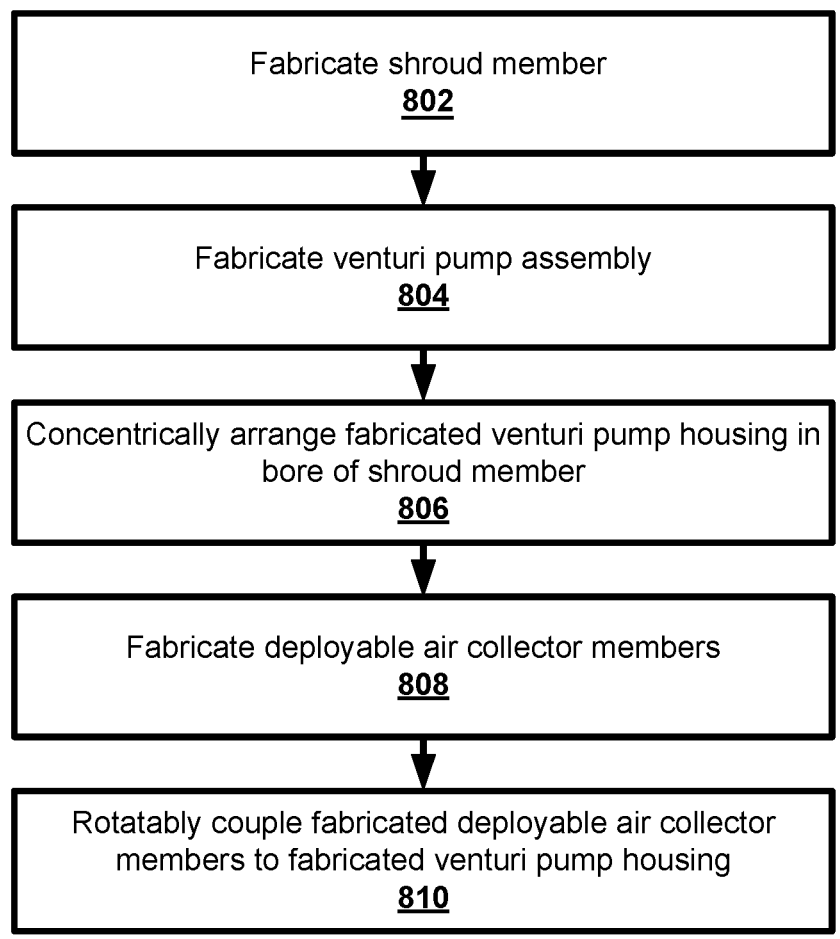
FIG. 8 illustrates a flow diagram of an advantageous embodiment of a method of fabricating a fuel jettison system.

FIG. 8 illustrates a flowchart of a method 800 for fabricating a fuel jettison system for an aircraft, in accordance with one or more exemplary embodiments.

In the illustrated method 800 of FIG. 8, illustrated process block 802 includes fabricating a shroud member (e.g., shroud member 210).

In accordance with illustrated process block 802, fabricating a shroud member comprises fabricating the shroud member to have a generally cylindrical configuration that defines an internal bore.

In accordance with illustrated process block 802, fabricating a shroud member comprises fabricating the shroud member to have one or more pistons at an aft end, the one or more pistons projecting from an interior wall into the bore.

The method 800 may then proceed to illustrated process block 804, which includes fabricating a venturi pump assembly (e.g., venturi pump assembly 220).

In accordance with illustrated process block 804, fabricating the venturi pump assembly comprises fabricating a venturi pump housing (e.g., venturi pump housing 230) having a generally cylindrical configuration that defines an internal bore with a transition zone (e.g., transition zone 240) where fuel is entrained by an airstream (as a motive fluid) flowing over an aerodynamic surface of the aircraft.

In accordance with illustrated process block 804, fabricating the venturi pump assembly comprises fabricating one or more air inlets (e.g., one or more air inlets 232) spaced apart in a longitudinal direction in a peripheral wall of the venturi pump housing and proximate the transition zone.

In accordance with illustrated process block 804, fabricating the venturi pump assembly comprises fabricating a venturi nozzle (e.g., venturi nozzle 250).

In accordance with illustrated process block 804, fabricating the venturi pump assembly comprises attaching the fabricated venturi nozzle to an aft end of the venturi pump housing downstream of the transition zone.

The method 800 may then proceed to illustrated process block 806, which includes concentrically arranging the fabricated venturi pump housing in the bore of the shroud member in a manner that enables selective movement of the venturi pump housing (along a longitudinal axis) in the bore from a stowed position to a deployed position.

In accordance with illustrated process block 806, concentrically arranging the fabricated venturi pump housing in the bore of the shroud member comprises fluidically sealing a junction or interface between the fabricated shroud member and the fabricated venturi pump housing.

The method 800 may then proceed to illustrated process block 808, which includes fabricating one or more deployable air collector members (e.g., one or more deployable air collector members 260).

The method 800 may then proceed to illustrated process block 810, which includes rotatably coupling the fabricated one or more deployable air collector members at a rotational axis to an exterior surface of the fabricated venturi pump housing.

In accordance with illustrated process block 810, rotatably coupling the fabricated one or more deployable air collector members comprises positioning one or more bias members (e.g., one or more bias members 270) between the fabricated one or more deployable air collector members and the exterior surface of the fabricated venturi pump housing.

The terms "communication," "coupled," "attached," or "connected" can be used herein to refer to any type of relationship, direct or indirect, between the components in question, and can apply to electrical, mechanical, fluid, optical, electromagnetic, electromechanical or other connections. Additionally, the terms "first", "second", "third", etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action can occur, either in a direct or indirect manner.

Those skilled in the art will appreciate from the foregoing description that the broad techniques of the examples of the present disclosure can be implemented in a variety of forms.

Therefore, while the examples of this disclosure have been described in connection with particular examples thereof, the true scope of the examples of the disclosure should not be so limited since other modifications will become apparent to the skilled practitioner upon a study of the drawings, specification, and following claims.

What is claimed is:

1. A fuel jettison system for an aircraft, the fuel jettison system comprising:
 a shroud member; and
 a venturi pump assembly including a venturi pump housing concentrically received in the shroud member for movement from a stowed position in the shroud member to a deployed position to at least partially project from the shroud member into an airstream environment of the aircraft to accelerate the fuel and facilitate, via a venturi effect, discharge of the fuel from the aircraft.

2. The fuel jettison system of claim 1, wherein a flow of pressurized fuel into the venturi pump housing forces the venturi pump housing to advance aft relative to a wing and relative to the shroud member to the deployed position.

3. The fuel jettison system of claim 2, wherein the venturi pump housing comprises one or more air inlets operable to draw, in the deployed position of the venturi pump housing, an airstream flowing over an aerodynamic surface of the aircraft into the venturi pump housing to entrain the fuel.

4. The fuel jettison system of claim 3, wherein the venturi pump assembly comprises a venturi nozzle which causes an increase in flow velocity of the entrained fuel.

5. The fuel jettison system of claim 4, further comprising one or more air collector members rotatably coupled to the venturi pump housing to capture the airstream flowing over the aerodynamic surface of the aircraft.

6. The fuel jettison system of claim 5, wherein the one or more air collector members are operable for rotation from a stowed air collector position which covers the one or more air inlets to a deployed air collector position which exposes the one or more air inlets to facilitate capture of the airstream to be drawn into the venturi pump housing.

7. The fuel jettison system of claim 6, further comprising one or more bias members operable to apply a spring load to a corresponding one of the one or more air collector members in the stowed air collector position of the one or more air collector members.

8. The fuel jettison system of claim 7, wherein the movement of the venturi pump housing to the deployed position facilitates rotation of the one or more air collector members to the deployed position by force of the spring load and an aerodynamic load during flight of the aircraft.

9. An aircraft, comprising:
 a fuel jettison system to cause an inflight discharge of fuel from the fuel system, the fuel jettison system including:
  a shroud member; and
  a venturi pump assembly including a venturi pump housing concentrically received in the shroud member for movement from a stowed position in the shroud member to a deployed position to at least partially project from the shroud member into an airstream environment of the aircraft to accelerate the fuel and facilitate, via a venturi effect, discharge of the fuel from the aircraft.

10. The aircraft of claim 9, wherein a flow of pressurized fuel into the venturi pump housing forces the venturi pump housing to advance aft relative to a wing and relative to the shroud member to the deployed position.

11. The aircraft of claim 10, wherein the venturi pump housing comprises one or more air inlets operable to draw, in the deployed position of the venturi pump housing, an airstream flowing over an aerodynamic surface of the aircraft into the venturi pump housing to entrain the fuel.

12. The aircraft of claim 11, wherein the venturi pump assembly comprises a venturi nozzle which causes an increase in flow velocity of the entrained fuel.

13. The aircraft of claim 12, further comprising one or more air collector members rotatably coupled to the venturi pump housing to capture the airstream flowing over the aerodynamic surface of the aircraft.

14. The aircraft of claim 13, wherein the one or more air collector members are operable for rotation from a stowed air collector position which covers the one or more air inlets to a deployed air collector position which exposes the one or more air inlets to facilitate capture of the airstream to be drawn into the venturi pump housing.

15. The aircraft of claim 14, further comprising one or more bias members operable to apply a spring load to a corresponding one of the one or more air collector members in the stowed air collector position of the one or more air collector members.

16. The aircraft of claim 15, wherein the movement of the venturi pump housing to the deployed position facilitates rotation of the one or more air collector members to the deployed position by force of the spring load and an aerodynamic load during flight of the aircraft.

17. A method of jettisoning fuel from an aircraft in flight, the method comprising:
 causing a transfer of pressurized fuel from one or more fuel storage tanks of a fuel system to a venturi pump housing of the fuel jettison system to advance the venturi pump housing in an aft direction relative to a wing of the aircraft and into an airstream environment of the aircraft to a deployed position to accelerate the fuel and facilitate, via a venturi effect, discharge of the fuel from the aircraft.

18. The method of claim 17, wherein one or more deployable air collector members of the fuel jettison system are induced, concurrently with the venturi pump housing advancing in the aft direction, to a deployed air collector position by spring loading and aerodynamic loading.

19. The method of claim 18, wherein inducement of the one or more deployable air collector members to the deployed air collector position draws an airstream flowing over an aerodynamic surface of the aircraft into the venturi pump housing to entrain the pressurized fuel.

20. The method of claim 18, wherein drawing the airstream into the venturi pump housing entrains the fuel for acceleration caused by a venturi nozzle of the fuel jettison system.

* * * * *